Figure 3:
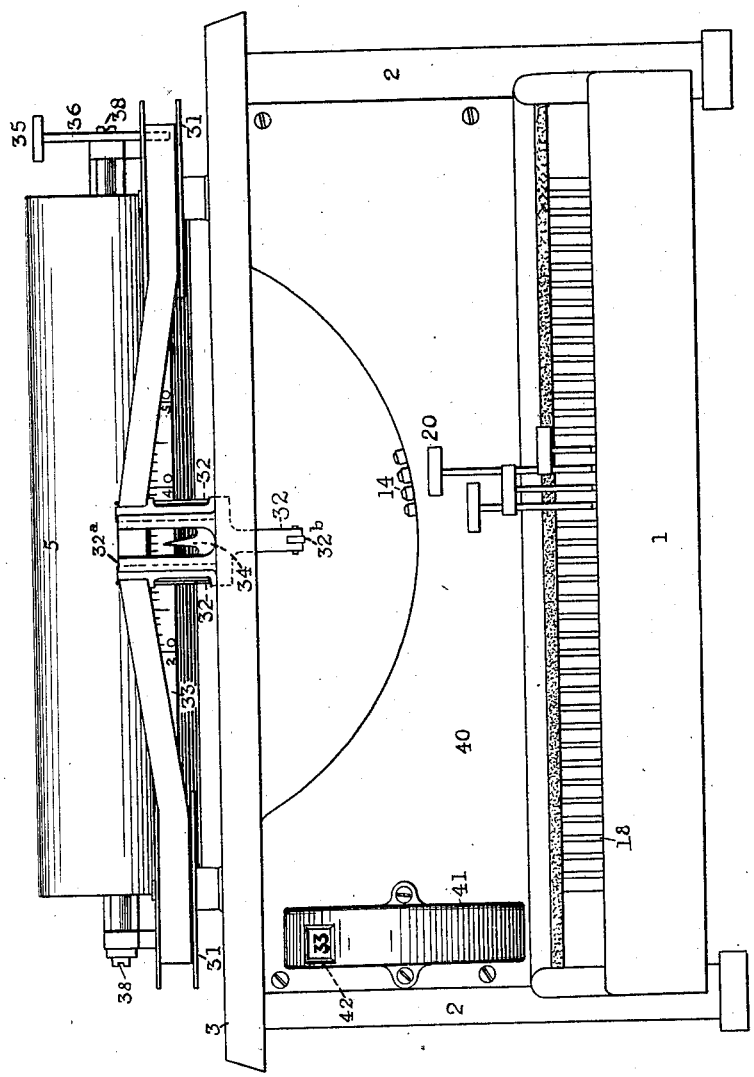

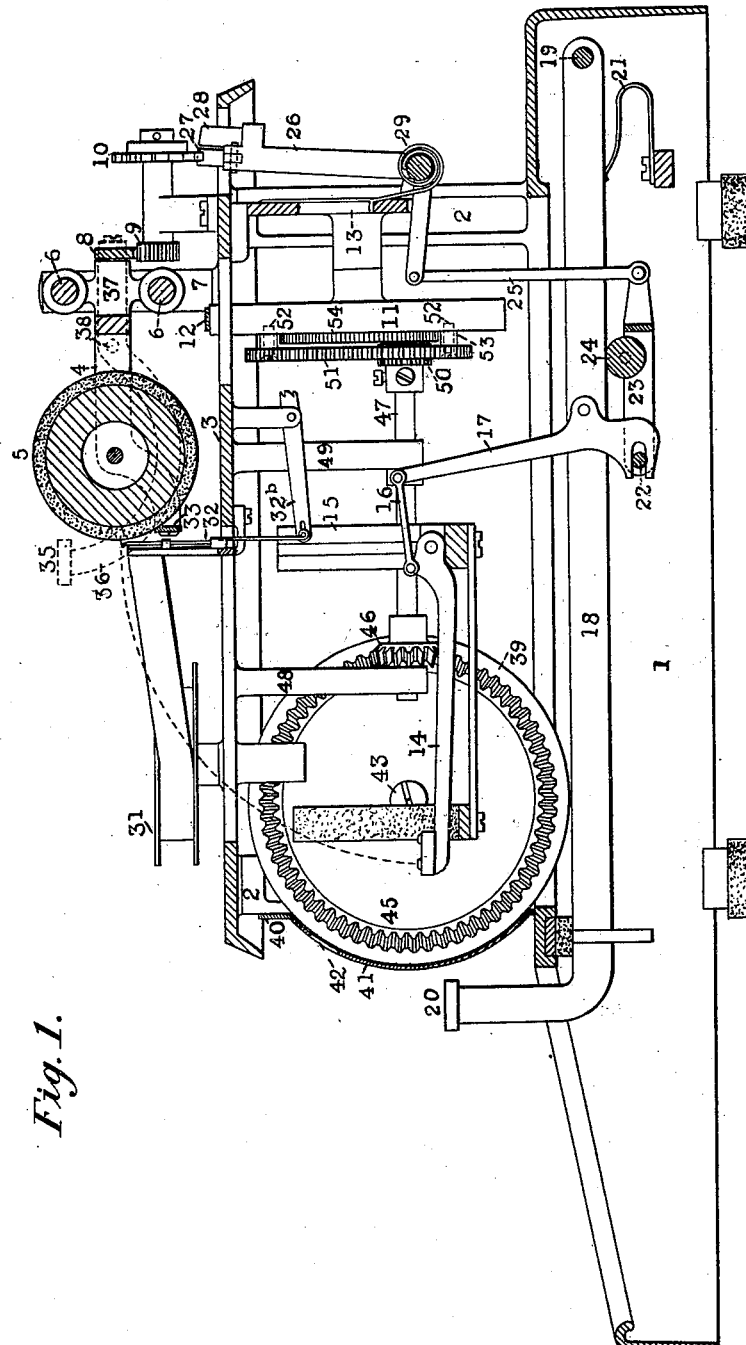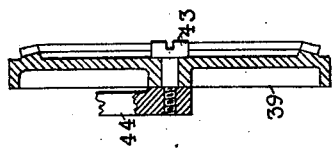

No. 660,988.  
J. FELBEL.  
TYPE WRITING MACHINE.  
(Application filed May 29, 1900.)  
Patented Oct. 30, 1900.

(No Model.)  
3 Sheets—Sheet 2.

WITNESSES:  
K. V. Donovan.  
E. M. Wells.

INVENTOR:  
Jacob Felbel

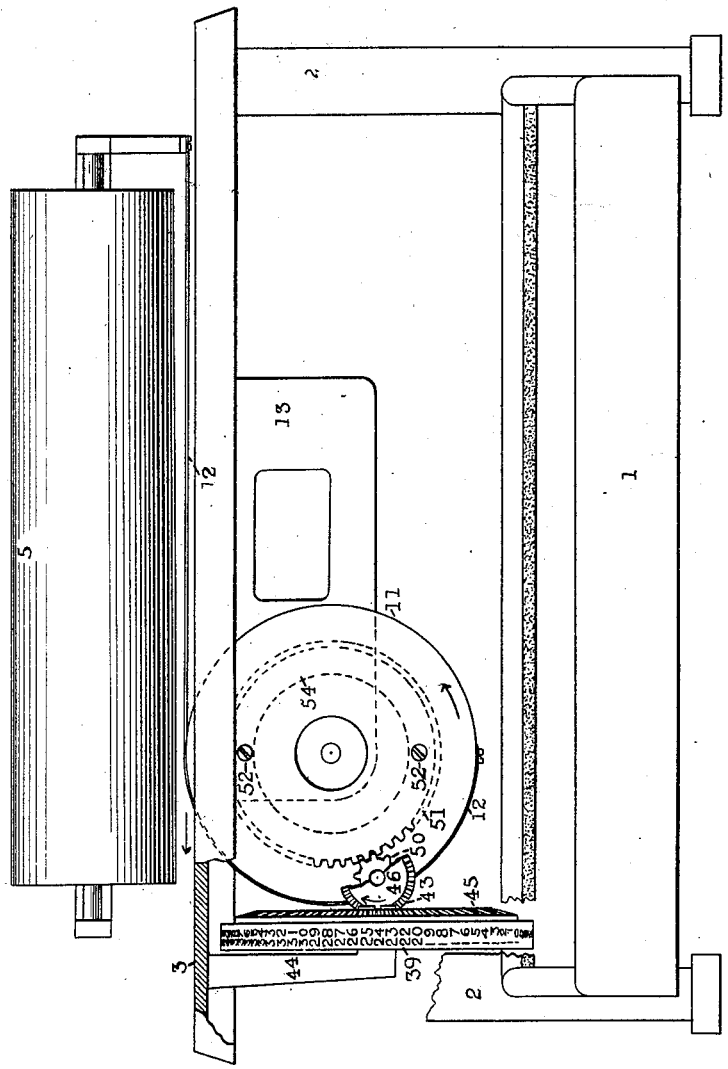

UNITED STATES PATENT OFFICE.

JACOB FELBEL, OF NEW YORK, N. Y.

TYPE-WRITING MACHINE.

SPECIFICATION forming part of Letters Patent No. 660,988, dated October 30, 1900.

Application filed May 29, 1900. Serial No. 18,353. (No model.)

*To all whom it may concern:*

Be it known that I, JACOB FELBEL, a citizen of the United States, and a resident of the borough of Manhattan, city of New York, in the county of New York and State of New York, have invented certain new and useful Improvements in Type-Writing Machines, of which the following is a specification.

My present invention in type-writing machines has for its main object to enable the operator to more promptly adjust the endwise-reciprocatory paper or type carriage to any desired point, as well as to ascertain its position more readily when at rest.

Heretofore carriages of type-writing machines have usually been provided with scales which extend longitudinally of the carriage and which coöperate with stationary indexes. Said scales are usually provided with long dividing-marks for indicating "tens," shorter marks for indicating "fives," and still shorter marks for indicating the remaining units. In reading such a scale it is necessary when the index points to one of the shortest marks to count the marks between it and the nearest numbered long mark either to the right or to the left, as the case may be, and then by addition or subtraction to determine the number represented by the short mark in question. The calculation and thought involved in this mental process are wearisome to the operator, and, moreover, the liability of mistakes is very great, and as only the tens are positively indicated upon the scale the fives are liable to be read erroneously—as, for instance, in confounding "35" with "25"—while the other units-marks, having no individuality to distinguish one from another, are proportionately more difficult to read, especially in the case of units-marks that are removed two or three spaces from the nearest longer mark. For instance, "28" and "32" are often mistaken one for another; so are "38" and "42," "47" and "53," and so on. In these instances the operator perceives only that the index points to a short mark—that is, two or three removes from the nearest tens mark, and hence is liable to add two or three to the number indicated by the tens-mark when he should really subtract, and vice versa.

In some machines the graduated carriage-scales instead of being straight and extending longitudinally of the platen have been made in circular or wheel form and rotative and have been provided with a pointer or index-mark; but the difficulties above set forth are present in said circular scales the same as in the straight scales.

In carrying out my invention I provide means for always presenting to the view of the operator a number which corresponds with the position of the carriage and which indicates the number of steps said carriage has taken from its normal right-hand starting-point. This information is given to the operator without the necessity of making the slightest mental calculation or any effort whatever beyond what is involved in merely glancing at said number, and the possibility of errors of the kind mentioned above is wholly avoided.

My invention consists in certain combinations of devices and features of construction, all as will be more fully hereinafter set forth, and particularly pointed out in the concluding claims.

In the accompanying drawings, Figure 1 is a longitudinal sectional elevation of a "front-strike" type-writing machine embodying my improvements. Fig. 2 is a sectional elevation of a number-wheel, showing its preferred form or construction and the method of mounting the same. Fig. 3 is a front elevation of the machine, showing a sight-hole and a number appearing therethrough which tells the position of the carriage. Fig. 4 is a view similar to Fig. 3, but omitting the front plate of the machine, so as to show the number-wheel and other details.

In the several views parts are omitted or broken away to more clearly exhibit the invention, and similar parts are designated by similar numerals of reference.

1 designates the rectangular base of the machine, 2 corner-posts rising therefrom, and 3 a top plate supported upon the posts. A carriage 4, bearing a platen 5, slides upon rails 6, which are fixed upon brackets 7, rising from the top plate. A rack 8 upon the carriage meshes with a pinion 9, which is connected to an escapement-wheel 10. The carriage is propelled by a spring-drum 11, which is connected by a strap 12 thereto and which is mounted upon a bracket 13, depending from the under side of the top plate. Type-bars 14 are pivoted at their rear ends in a segment 15 and strike upwardly and rearwardly against the platen. The type-bars are operated by means of links 16, bell-cranks 17, and key-levers 18, to which said bell-cranks are pivoted. The key-levers are pivoted at their rear ends upon a fulcrum-rod 19 and are provided with keys 20 and returning-springs 21. Beneath the key-levers is supported a transverse fulcrum-rod 22, which is engaged by the forked lower ends of all the bell-levers 17. Upon said rod 22 is hinged a frame 23, which supports a universal bar 24, and is connected by a vertical link 25 to the horizontal arm of a dog-rocker which is pivoted in said bracket 13 and whose upright arm 26 carries a feeding-dog 27 and a detent-dog 28. A returning-spring 29 is provided for the dog-rocker and serves also to hold the universal bar 24 normally up against the key-levers. A ribbon 30 is by any suitable mechanism (not shown) wound alternately upon spools 31, which are supported above the top plate, and the portion of the ribbon which is midway between the spools is vibrated upwardly at each key-stroke, so as to cover the printing-point, the ribbon being threaded through any suitable sliding or other vibrator 32 for this purpose, and said vibrator being operated by a lever 32$^b$ or otherwise.

I have shown herein the usual straight platen-scale 33 and in connection therewith a pointer 34 for indicating the progress and position of the carriage. Said pointer 34 is illustrated, however, mainly for the purpose of illustrating the defects and inconvenience attending the use thereof in ascertaining the position of the carriage, especially in that type of machine known as "visible-writing machines." The scale 33 is suitably supported in proximity to the platen and below the printing-point.

A release-key 35 is provided upon the carriage, said key being fixed upon a forward extension 36 of one arm of a bail 37, the said bail including as one member the rack 8 and being pivoted or hinged to the carriage-frame on opposite sides at 38. Upon depression of the key 35 the rack is lifted out of engagement with the pinion 9 and the carriage may be moved freely along in either direction.

It will be noted, Fig. 3, that the view of the scale is intercepted to some extent by the ribbon, the ribbon-vibrator 32, and its fixed forked guide 32$^a$, which latter, if desired, may be fashioned into a type-guide. On account of the presence of these devices it is difficult to read the scale and determine exactly the position of the carriage, particularly when one or more of the numbers "10," "20," "30," &c., provided upon said scale stand behind the ribbon-vibrator or its associated devices. Owing to this difficulty, it is not possible by the use of the scale and pointer to position or adjust the carriage after releasement thereof by the key 35 with sufficient rapidity and accuracy, nor is it possible to quickly or conveniently ascertain the position of the carriage at any given time in the ordinary step-by-step movements of the carriage. To remedy these objections and also to avoid the use of graduated scales, with their attending difficulties, as hereinabove described, for the purpose of determining the progress and position of the carriage, I have provided at the front of the machine a vertically-arranged rotary number-wheel 39, the numbers thereon reading from "0" to "70," more or less, according to the travel of the carriage. The wheel is arranged transversely to the run of the carriage or rotates in a plane at right angles to the endwise movement of the carriage, and the numbers thereon are arranged in numerical order in a column which extends around the periphery of the wheel. The numbers may be stamped upon the wheel or they may be printed upon a strip of paper and the latter secured around the periphery of the wheel by means of shellac or other adhesive substance. A vertical front plate 40, which extends across the machine between the front corner-posts 2 and which plate may also be considered as a portion of the machine-framing, is provided near its left-hand end with a segment-shaped shield or hood 41, which covers the front portion of the number-wheel. In order that only one number at a time may be visible to the operator, I provide a sight-hole 42 in the hood 41, said hole being preferably located at a point about midway between the top and front of the wheel, at which point a number on the wheel can be easily read by the operator.

The number-wheel is pivoted upon a horizontal shoulder-screw 43, which is screwed into the lower end of an arm or bracket 44, which latter depends from the under side of the top plate 3. Formed integrally with the wheel is a large bevel-gear 45, which meshes with a bevel-pinion 46, the latter being fixed upon the forward end of a horizontal revoluble shaft 47, which is mounted in brackets 48 and 49, depending from the top plate, the axis of the shaft being preferably at right angles to the axis 43 of the number-wheel. The rear end of the shaft carries a pinion 50, which meshes with a spur-wheel 51, the latter being secured upon the front vertical face of the spring-barrel 11 by means of screws 52. Collars 53 are placed upon the shanks of the screws, slightly separating the gear-wheel 51 from the spring-barrel and affording room for a ratchet-wheel 54, which is usually secured upon the spring-barrel for operating the ribbon-winding mechanism.

In the operation of the machine a type-key 20 is depressed, vibrating its lever 18 downwardly and through the bell-lever 17 and link 16 swinging the type-bar 14 to the platen to make an impression of the type upon the paper arranged thereon. Upon release of the finger-key from pressure said parts are returned to normal position by spring 21. During the reciprocation of the lever 18 the dog-rocker is caused to vibrate by means of the described connections, and the escapement devices permit an advance movement of the carriage toward the left in the usual manner under the influence of the spring-drum 11. The movement of the latter is communicated by gears 51 50, shaft 47, and gears 46 and 45 to the number-wheel, which accordingly is given a partial rotation, so that the next higher number is brought into view at the sight-opening 42. As the operation of depressing the keys is repeated the number-wheel is rotated step by step, each time presenting a new number, so that the operator when wishing to ascertain the position of the carriage needs only to glance at the number which is visible at the time through the opening or sight-hole. Upon the completion of the line of writing the carriage is returned by the operator to begin a new line, and through the connection 12 the spring-barrel is rotated reversely to rewind the spring therein. By means of the described positive connections to the spring-barrel the number-wheel is also rotated reversely, so that when the carriage reaches its normal starting-point for a new line the character "0" or zero appears through the sight-hole 42. If the carriage should be arrested at any point during its return movement or during a rapid movement thereof in letter-space direction when released from the control of the escapement devices by the key 35, the number which appears through said sight-hole at once informs the operator of the exact position of the carriage. Thus the difficulty of mentally calculating said position by means of graduations, lines, or marks upon a carriage-scale, as 33, is wholly avoided, as well as the constant liability of misreading the scale, and consequently imprinting the letters at a wrong point in the line of writing. By the use of the release-key and the number-wheel the carriage can be adjusted instantly to any desired position without possibility of confusion, and the work of the operator is thereby greatly facilitated.

It will be noted that the spur-wheel 51 is about three-fourths as large as the spring-barrel, whose periphery moves at the same speed as the paper-carriage, and also that the diameter of the pinion 50, which meshes with said spur-wheel, is nearly one-half as great as the diameter of the bevel-pinion 46. The peripheral speed of the latter is therefore nearly one and one-half times as great as the speed of the carriage, and since the diameter of the bevel-gear 45, which meshes with the pinion 46, is somewhat less than the diameter of the number-wheel it follows that the movement of the peripheral or numbered portion of the said number-wheel is about one and one-half times as great as the corresponding movement of the carriage. I employ the described motion-multiplying gearing between the carriage and the number-wheel for the purpose of enabling comparatively large figures to be placed upon the latter, which may hence be easily read. Obviously this would not be the case if the peripheral movement of the number-wheel were substantially equal to the longitudinal movement of the carriage, which is usually only one-tenth of an inch at each type impression. In the latter case the height of the figures on the wheel would need to be even less than one-tenth of an inch in order to leave a slight margin at the top and bottom; but by the use of the described gearing I am enabled to use figures of greater height than one-tenth of an inch and of such size as to be read at a glance by the operator without bending forward.

By referring to Fig. 3 it will be noted that it is almost impossible to determine the position of the carriage by means of the scale 33 and index 34. All that can be seen through the opening in the ribbon devices are three similar short marks upon the scale, which do not and cannot mean anything only as read in connection with the nearest longer marks or divisions, which in this instance are behind the vibrator-guides and out of sight; but by reference to the number appearing at the sight-opening 42 the position of the carriage is instantly read or determined. Of course the scale 33 is useful in other ways, particularly when inserting a sheet of paper into the machine, in that it enables the operator to correctly position or aline the sheet; but for quickly moving the carriage along in either direction to any desired point or for ascertaining its position at any time my invention presents important advantages.

Even in cases where the view of the usual carriage-scale and index is unobstructed the necessity remains of often making mental calculations, and vexatious mistakes are of frequent occurrence. For instance, when the pointer stands opposite the third short mark at the left of the nearest long division upon the scale—say "40"—the operator cannot be sure without delaying to give the matter some thought whether the carriage is at "43" or "37." The liability to such mistakes is wholly avoided by the use of my invention, while at the same time the necessity of making any mental calculation whatever is eliminated, and the work in consequence is greatly expedited. The graduations upon the usual carriage-scale are quite fine, making them difficult to examine, and hence it is an almost universal custom of operators upon understrike machines when examining the platen-scale to crane or bend forward, so as to get a better view thereof. Sometimes the scale is covered with ink from the ribbon, making the marks thereon almost indistinguishable, and for these and other reasons the eyes of the operator are subjected to considerable strain. All of these objections are avoided by the use of my invention, as all the figures on the number-wheel are of large size, so as to be easily read by the operator without bending forward from his natural position.

Heretofore the centering of head-lines has been difficult, owing to the confusion resulting from first calculating the position of the carriage from the scale and then calculating the point or number at which the writing upon the line should begin in order to bring the heading to the center and then moving the carriage to the necessary position, which last operation of course involves still further calculation. By the use of my invention this task is greatly simplified. For instance, if it be desired to center the words "United States," the operator taps the key once for each letter and space and then notes the number which appears upon the number-wheel, which in this instance would be "12." Then twelve is subtracted from the highest number upon the wheel, which, say, is "70," leaving fifty-eight. This number is then divided by two, making twenty-nine. Then the operator moves the carriage along until "29" shows at the sight-opening and begins writing the words, which will therefore appear at the center of the line. The liabilities to mistakes which have occurred in using the ordinary scale—such as confounding "12" and "8" and "29" and "31"—are avoided, as well as the errors which would be likely to occur from the necessity of making the three sets of calculations using the ordinary scale—that is to say, first, in calculating the position of the carriage, then in calculating at what number or point to begin, and then, finally, in calculating, by means of the scale and index, so as to place the carriage at the desired point. So much calculation is found to be so objectionable that, except in doing the best class of work, operators are prone to merely guess where the starting-point of the heading should be, so as to avoid the mental labor involved in properly centering the same; but in using my invention the operation is much simplified and facilitated, only one calculation being required, so that in general a better class of work is produced.

It will be observed that the oscillatory or curvilinear reciprocatory movements of the number-wheel correspond with and are governed by the rectilinear reciprocatory movements of the carriage and that said wheel is controlled by the same step-by-step feeding devices as the carriage. It will also be noted that I have provided a wheel with a series of whole numbers arranged in numerical or consecutive order and corresponding to the feeding movements of the paper-carriage—that is to say, the first number upon said wheel is "0" to agree with the normal position of the carriage, and the last number is, say, "70" to agree with the extreme left-hand position of the carriage. It will further be noted that the height of each number upon the wheel exceeds the letter-space movement of the paper-carriage or the interval between two adjacent divisions upon the scale 33 and that said numbers consequently require a peripheral step-by-step movement of the number-wheel which is greater than the step-by-step movement of the carriage. Means are provided for effecting this increased motion and for maintaining the proper step-by-step speed of the number-wheel relatively to the step-by-step movement of the carriage.

Numerous changes may be made in the details of construction and arrangement within the scope of the invention. For instance, a number-wheel of large diameter may be arranged to turn in a vertical or horizontal plane which is parallel with the run of the carriage, and the numbers may be placed upon the face of the wheel and near the perimeter thereof instead of being arranged around its periphery, and the movement of the number-bearing portion of the wheel may also exceed the corresponding movement of the carriage.

The type-movement and other improvements illustrated herein are made the subject-matter of my pending applications, Serial No. 719,419, filed June 5, 1899, and Serial No. 12,498, filed April 12, 1900. The improvements claimed in this application are not shown in my said pending applications.

What I claim as new, and desire to secure by Letters Patent, is—

1. In a type-writing machine, the combination of a carriage constructed to reciprocate in letter-space direction along the framework of the machine, a wheel mounted in the framework of the machine independently of said carriage and bearing upon its periphery a series of numbers arranged in numerical order, one number for each letter-space movement of said carriage, connections between said number-wheel and said carriage for causing the number-wheel to oscillate as the carriage reciprocates, and also for causing the movement of the peripheral portion of the number-wheel to be greater than the corresponding movement of the carriage, and step-by-step letter-feeding devices controlling the movements of both said carriage and said number-wheel.

2. In a type-writing machine, the combination of a step-by-step letter-feeding mechanism, a carriage constructed to reciprocate in letter-space direction along the framework of the machine, a wheel mounted in the framework of the machine independently of said carriage and bearing a column of numbers, the height of each number exceeding the corresponding step-by-step letter-feeding movement of the carriage, and connections between said number-wheel and said carriage for causing the number-wheel to oscillate as the carriage reciprocates.

3. In a type-writing machine, the combination of step-by-step letter-feeding devices, a carriage constructed to reciprocate in letter-space direction along the framework of the machine, and a wheel operatively connected to said carriage but mounted in the framework of the machine independently thereof, said wheel being provided with a series of numbers upon a surface or portion thereof which travels step by step at a greater rate of speed than the step-by-step movements of the carriage, and said numbers being arranged in numerical order, one number for each letter-space movement of the carriage.

4. In a type-writing machine, the combination of step-by-step letter-feeding devices, a carriage constructed to reciprocate in letter-space direction along the framework of the machine, a wheel provided with a single series of easily-read whole numbers, one number for each complete letter-space movement of the carriage, said numbers being arranged in consecutive order and presented to the operator in their natural positions, and means for causing said wheel to oscillate as the carriage reciprocates.

5. In a type-writing machine, the combination of step-by-step letter-feeding devices, a carriage constructed to reciprocate in letter-space direction along the framework of the machine, a vertically-arranged wheel mounted in the framework of the machine independently of said carriage, means for causing said wheel to oscillate as said carriage reciprocates, a column of numbers extending in numerical order around the peripheral face of said wheel, said numbers corresponding to the letter-feed movements of the carriage and being successively presented to the operator in their natural positions, and means for indicating to the operator the number on the wheel which corresponds to the position of the carriage.

6. In a type-writing machine, the combination of step-by-step letter-feeding devices, a carriage constructed to reciprocate in letter-space direction along the framework of the machine, a wheel connected to said carriage so as to oscillate as the carriage reciprocates, a series of numbers arranged in numerical order upon said wheel, one number for each letter-feed movement of said carriage, and a sight-hole so arranged with reference to said wheel that only that one of said numbers which tells the position of the carriage is visible to the operator.

7. In a type-writing machine, the combination of step-by-step letter-feeding devices, a carriage constructed to reciprocate in letter-space direction along the framework of the machine, a wheel arranged within the framework of the machine and mounted independently of said carriage, means for causing said wheel to oscillate as the carriage reciprocates, a series of whole numbers arranged in numerical order around said wheel, and a sight-hole in the framework through which the number which tells the position of the carriage is visible to the operator.

8. In a type-writing machine, the combination of step-by-step letter-feeding devices, a carriage constructed to reciprocate in letter-space direction along the framework of the machine, a wheel arranged vertically at the front of the machine, means for causing said wheel to oscillate as the carriage reciprocates, a series of numbers extending in numerical order around the periphery of said wheel, and a sight-hole through which said numbers are visible one at a time and in their natural positions.

9. In a type-writing machine, the combination of step-by-step letter-feeding devices, a carriage constructed to reciprocate in letter-space direction along the framework of the machine, a platen upon said carriage, a wheel arranged vertically at the front of the machine and mounted in the framework independently of said carriage, operative connections extending from said wheel to said carriage, a series of numbers extending in numerical order around the periphery of said wheel, and a sight-hole arranged between the top and the front of said wheel.

10. In a type-writing machine, the combination of a power-driven reciprocatory carriage, escapement devices, a release-key, a wheel positively connected to said carriage and arranged to rotate in a plane at right angles to the direction of travel of the carriage, a column of numbers extending in numerical order around said wheel, and a sight-hole.

11. In a type-writing machine, the combination with a reciprocatory carriage and step-by-step feeding devices of a wheel having numbers arranged in numerical order thereon, and a motion-multiplying gear positively connecting said number-wheel to said carriage so that it may reciprocate therewith 12. In a type-writing machine, the combination of a reciprocatory carriage, a spring-barrel connected thereto, a gear fixed upon said barrel, a pinion in mesh with said gear, a forwardly-extending shaft upon which said pinion is mounted, a pinion carried upon the forward portion of said shaft, and an upright number-wheel having a gear which meshes with the last-mentioned pinion, the axis of said number-wheel being disposed crosswise of the axis of said shaft.

13. In a type-writing machine, the combination of a reciprocatory carriage, a spring-barrel connected thereto, a gear secured by screws to said spring-barrel, collars arranged upon said screws between the spring-barrel and the gear, a pinion in mesh with said gear, a bevel-pinion connected by a rearwardly-extending shaft to said first pinion, a number-wheel whose axis is arranged at right angles to the axis of said shaft, said number-wheel being provided with an integral bevel-gear which meshes with said bevel-pinion, and a sight-hole for said number-wheel.

14. In a type-writing machine, the combination of a reciprocatory carriage having a platen, a series of type-bars arranged forwardly of the platen, a front plate extending across the machine, a number-wheel connected to the carriage and arranged in rear of said plate, and a sight-hole arranged at said number-wheel.

15. In a type-writing machine, the combination of a reciprocatory carriage having a platen, a series of type-bars arranged forwardly of the platen, a front plate extending across the machine, a number-wheel connected to the carriage and arranged in rear of said plate, a hood provided upon said plate for said wheel, and a sight-hole provided in said hood.

Signed at the borough of Manhattan, city of New York, in the county of New York and State of New York, this 28th day of May, A.D. 1900.

JACOB FELBEL.

Witnesses:
K. V. DONOVAN,
E. M. WELLS.